Jan. 17, 1967     P. D. SCHWIEBERT     3,298,324
LOCK MECHANISM FOR A LADING TIE-DOWN ANCHOR DEVICE
Filed March 14, 1966
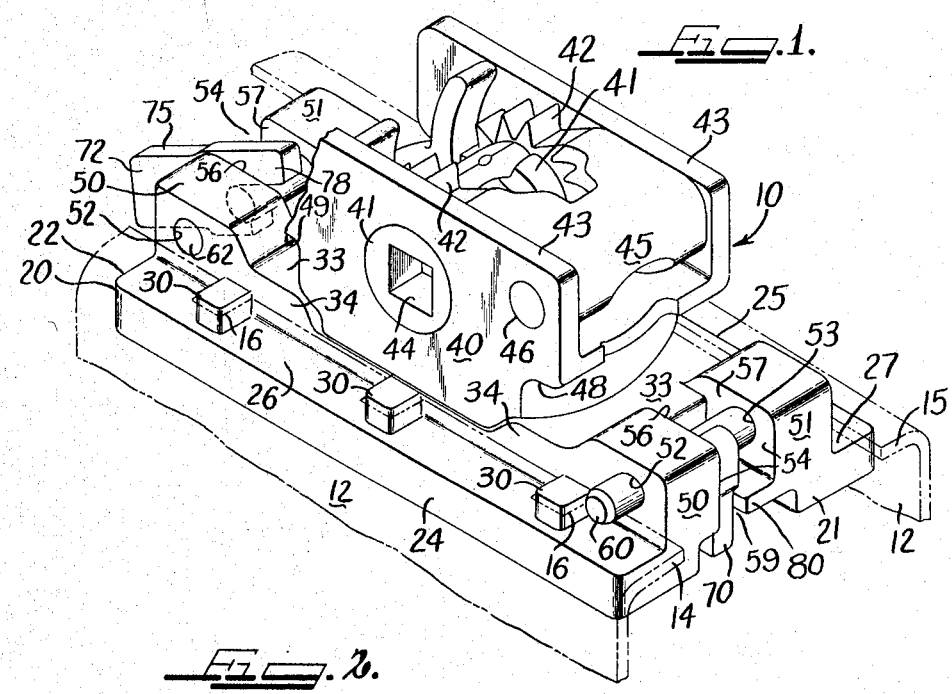
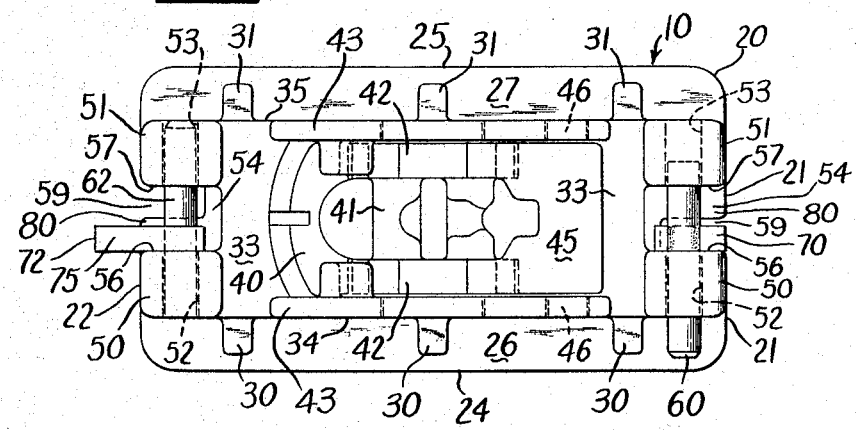
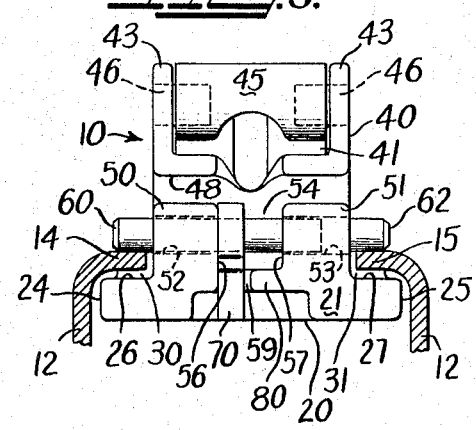
INVENTOR
PHILLIP D. SCHWIEBERT
BY
Horton, Davis, Brewer & Brugman
Attys.

United States Patent Office 3,298,324
Patented Jan. 17, 1967

---

3,298,324
LOCK MECHANISM FOR A LADING TIE-DOWN ANCHOR DEVICE
Phillip D. Schwiebert, Glencoe, Ill., assignor to MacLean-Fogg Lock Nut Company, Mundelein, Ill., a corporation of Delaware
Filed Mar. 14, 1966, Ser. No. 534,061
12 Claims. (Cl. 105—369)

This invention relates generally to lading tie-down anchor devices, and with more particularity, to an improved lock mechanism therefor.

This is a continuation-in-part of the subject matter disclosed in the prior copending joint application, Serial No. 456,912, filed May 17, 1965.

Freight carriers, such as railroad flat cars, or the like, often employ lading ties which are affixed thereon by means of anchor devices within open mooring channels in the bed of the carrier. The anchor devices are movable along the channel, under opposed retaining flanges thereof, to various positions where they may be secured. Securement of an anchor device at a particular position is commonly accomplished by an engagement between teeth projecting from the anchor device and notches in the retaining flanges. Normally, the engagement occurs upon an upward lifting of the anchor device against the retaining flanges. Naturally, it is essential that such engagement, securing the anchor device at a particular position, be locked. This is so that even though the lading tie has a sufficient tension to hold the anchor device in engagement up against the retaining flanges, a loosening thereof may allow a disengagement. Thus, it is clear that a lock mechanism is required to maintain a positive and continuous engagement between the anchor device and retaining flanges. The novel anchor device of the aforesaid co-pending joint application discloses a dependable, though somewhat complex lock mechanism provided by cam activated sliding bars. Prior art mechanisms have proven to be less than satisfactory because they are undependable and unwieldy, though equally complex. What is needed is a positive lock mechanism which is simple and quick in operation.

Therefore, to overcome the foregoing and other difficulties of the prior art, the general object of this invention is to provide a new and improved lock mechanism which is positive and dependable, and yet simple and quick in operation.

One of the objects of this invention is to provide an improved lock mechanism having few moving parts, the manufacture thereof requiring fewer machining operations, and which is conservative of weight and material.

Another object of this invention is to lock only the diagonal corners of an anchor device in engagement with the retaining flanges in a mooring channel.

It is an object of this invention to provide for a quick and convenient transfer of anchor devices between various positions within a mooring channel.

A further object is the provision of a lock mechanism which utilizes the bias of gravity to insure a positive and continual lock.

It is still another object to provide a lock mechanism of durable and rugged construction for a jam-proof operation, and which is economical to produce by utilizing conventional, currently available materials that lend themselves to standard mass-production manufacturing techniques.

Further and other objects, and a more complete understanding of the invention may be had by referring to the following description and claims, taken in conjunction with the accompanying drawings in which:

FIG. 1 is a perspective view illustrating a novel anchor device having the lock mechanism of this invention thereon.

FIG. 2 is a top plan view of the anchor device and lock mechanism of FIG. 1, showing alternate dispositions of the lock mechanism at the opposite ends thereof.

FIG. 3 is an end elevational view of the anchor device and lock mechanism of FIG. 1, illustrating the extended dispositions of the illustrated lock devices.

For the purpose of illustrating the invention, there is shown in the drawings a form which is presently preferred, it being understood, however, that this invention is not limited to the precise arrangements and instrumentalities there shown.

Referring now to the drawings in detail, wherein like numerals indicate like elements, there is shown in FIG. 1 an illustration of the lock mechanism of the present invention in an adaptation to an anchor device designated generally at 10. The anchor device 10 is movable longitudinally along an open mooring channel 12 (shown in phantom in FIG. 1) to various positions along opposed retaining flanges 14, 15 thereof, Notches 16 in the retaining flanges 14, 15 are provided to correspond to various positions of the anchor device 10 therealong.

The anchor device 10, it is to be noted, has a base 20 with a winch 40 mounted thereon. The base 20 is a casting or forging of a rugged and durable metal having a generally rectangular configuration, as defined within the ends 21, 22 and side marginal flanges 24, 25. As illustrated, rectangular locking teeth 30, 31 are integral with the base 20 and project upwardly from the top surfaces 26, 27 of the side flanges 24, 25. The teeth 30, 31 are spaced to coincide with the spacing of the notches 16 for engagement therein to secure the anchor device 10 at a fixed position with reference to the channel 12. As illustrated, the base 20 has a mid-portion 33 which is raised somewhat above the top surfaces 26, 27 of the side flanges 24, 25 to provide the abutting vertical surfaces 34, 35 as well as a thicker bed suitable for mounting of the winch 40. The vertical surfaces 34, 35 which fit between flanges 14, 15 of the mooring channel serve firmly to seat the base 20 in position upon the bringing together of the base 20 and flanges 14, 15, and also the engagement of the teeth 30, 31 within the notches 16. Furthermore, it is to be noted that the teeth 30, 31 are integral with the raised mid-portion 33 and project outward from the vertical surfaces 34, 35, and are therefore additionally strengthened by being integrally backed.

The winch 40 is rotationally mounted on the raised mid-portion 33 of the base 20 to turn about an axis which is perpendicular to the base. A chain drum 41 with a ratchet 42 at each end thereof is journaled between opposed walls 43 of the winch 40, as shown. A hand implement, or the like (not shown) may be utilized to turn the drum 41 upon insertion into the drive socket 44 provided therefor. A pawl 45 is journaled between the walls 43 on pivots 46, at a position such that it is biased downward by gravity for engagement with the teeth of the ratchets 42, to prevent an unwinding of the drum 41 by conventional ratchet action. The winch 40 has a transverse dimension somewhat narrower than the space between the flanges 14, 15, and a longitudinal dimension, which is somewhat longer than its width. Under-surfaces 48, 49 are provided at opposite ends of the winch 40 to support the anchor device 10 on the flanges 14, 15, when the winch 40 is turned with its longitudinal dimension transverse to the flanges 14, 15 and the base 20. The combined height of the base 20 and winch 40 may be such that the entire anchor device 40 may be retracted to an out-of-the-way position within the mooring channel 12, whenever the winch 40 is longitudinally aligned with that channel, as shown, between the flanges 14, 15, and the teeth are disengaged from the notches 16, 17 by a downward separation between the base 20 and flanges 14, 15.

In the disclosed structure, two pairs of lugs, 50, 51 are provided at each end 21, 22 of the base 20. The lugs 50, 51 are integral projections on the base 20 at opposite sides of the mid-region of the mid-portion 33 thereof, projecting upward between the flanges 14, 15 with portions thereof extending well above and beyond the latter mentioned flanges. Bores 52, 53 are coaxial and pass through those upper portions of the lugs 50, 51 and have an axis transverse to the flanges 14, 15. Each pair of the lugs 50, 51 has a space 54 therebetween. The outer surfaces of the lugs 50, 51 are flush with the vertical surfaces 34, 35, while the inner faces 56, 57 oppose each other across the spaces 54. A slot 59 is provided in each end 21, 22 of the base 20, immediately adjacent an inner face 56, 57 of one of the lugs and immediately beneath a portion of the space 54, so as to be adjoined thereto.

A retaining bolt 60, 62 is slidably mounted in the aligned bores 52, 53 of each of the respective pairs of lugs 50, 51. The bolts 60, 62 may be retracted to a disposition within the lugs 50, 51 as shown in FIG. 2 at end 22, or extended to dispositions overlying one of the mooring channel flanges 14, 15, as indicated at end 21 of FIGS. 2 and 3. It is to be noted that the extended dispositions of the bolts 60, 62 are in opposed directions, as shown in FIG. 3. That is, the bolt 60 extends over the flange 14, while the bolt 62 extends over the flange 15. The extended end of each bolt is chamfered to facilitate an outward movement thereof over the flanges 14, 15, although the opposite ends need not be chamfered.

A latch member 70, 72 is affixed to the mid-region of each of the bolts 60, 62, and particularly to portions thereof which remain within the spaces 54 in either of the positions of the bolts. As may be visualized best with reference to the left side of FIG. 1, the latch members 70, 72 are of a general rectangular configuration having a somewhat narrower handle portion 75 of a length sufficient to extend, at a horizontal disposition, outward beyond the ends 21, 22 of the base 20. However, the handle portion 74 is not long enough to extend beneath the lower surfaces of the flange portions of the base 20 when in the downwardly extended position. As illustrated, the latch members 70, 72 are slotted to receive the bolts 60, 62 therein at positions which are slightly off-center with respect to the latch members. Thus, again referring to latch member 72, at the left side of FIG. 1, it is seen that the latch members 70, 72 have a projecting portion 78, which extends slightly above the lugs 50, 51 whenever the latch members are in a horizontal disposition extending outward from the ends 21, 22 of the base 20. The latch members 70, 71 are permanently affixed on their respective bolts 60, 61 in a suitable and secure fashion, such as by welding.

Whenever it is desired to secure the anchor device 10 at a particular chosen position along the mooring channel 12, it is necessary to engage the teeth 30, 31 within notches 16, corersponding to the position desired, by an upward closing together of the base 20 against the retaining flanges 14, 15. Naturally, it is desirable to hold such engagement while the appropriate lading ties and tensionings are accomplished. Furthermore, it is desirable that the engagement between the base 20 and flanges 14, 15 be dependably and positively locked. This may be easily accomplished in a fast and convenient fashion by grasping the latch members 70, 72 and sliding the bolts 60, 62 to their extended positions overlying the flanges 14, 15, respectively. In the extended positions, the latch members 70, 72 will be directly over the slots 59 provided at both ends 21, 22 of the base 20, and may easily swing down for retention therein. It is to be noted that the force of gravity tends to bias the latch members 70, 72 to the downward position within the slots 59, and therefore, although the latch members 70, 72 may at times be jarred upward by shocks transmitted thereto, they will have a natural tendency to return to positions within the slot 59. In this respect, the latch members 70, 72 are prevented from assuming a stable vertical position (where they could remain to work sideways and disengage) by the projecting portions 78 which abut against a face of mid-portion 33 of the base 20 to limit any upward rotation thereof. Thus, even under severe impact conditions the latch members 70, 72 will rotate upward so far, stop and then return to the locked positions. As long as the latch members 70, 72 remain in the slots 59, the bolts 60, 62 cannot be retracted to a position between the flanges 14, 15 of the mooring channel. When in their extended positions, the bolts 60, 62 rest on top of the flanges 14, 15 and support the anchoring device 10 at diagonally disposed corners thereof. When it is desired to disengage the teeth 30, 31 from the notches 16, 17 by a downward separation of the base 20 from the flanges 14, 15, the latch members 70, 72 must be swung out of the slots 59 before an inward retraction of the bolts 60, 62 may be accomplished. The inner faces 56, 57 of each pair of lugs 50, 51 provide limit stops abutting against the latch members 70, 72. With the bolts 60, 62 at their retracted positions, the latch members 70, 72 will rest upon ledge portions 80 of the base 20 adjacent the slots 59 and assume a generally horizontal position with the handle portion 74 extending outward beyond the ends 21, 22 of the base 20. In this position, the latch members 70, 72 are available for quick and convenient handling when it is again desired to place the bolts in their extended positions. In fact, all that is required is that the latch members 70, 72 be kicked toward the slots 59 by a blow at either of the handle portions 74 or the projections 78.

The present invention may be embodied in other specific forms without departing from the spirit or potential attributes thereof and, accordingly, reference should be made to the appended claims, rather than to the foregoing specification as indicating the scope of the invention.

I claim:

1. In a tie-down anchor device of the type including a base movable within opposed retaining flanges of an open mooring channel to positions therealong and means on said base engageable with said flanges to secure said anchor device thereat, as desired, by a closing together of said base and flanges for an engagement therebetween, a quick releasable mechanism to lock said engagement, comprising: a lug affixed on said base at a position between said flanges, said lug projecting from said base with a portion thereof extending outward, during said engagement, beyond said flanges, said lug portion having therethrough a bore at an axis transverse to said flanges; and a bolt within said bore slidable alternately between a retracted disposition intermedite said flanges and an extended disposition overlying one of said flanges, said retracted disposition allowing separation of said base and flanges for a disengagement therebetween, and said extended disposition preventing separation thereof to lock said engagement therebetween.

2. A quick, releasable mechanism in accordance with claim 1 wherein said lug is one of two identical lugs, one at each end of said base, both carrying bolts in their respective bores slidable alternately between retracted and extended dispositions, respectively.

3. A quick releasable mechanism in accordance with claim 2 wherein said bolts have extended dispositions in opposed directions, each bolt overlying an opposite one of said flanges, respectively, to lock said engagement at diagonal corners of said base.

4. A quick releasable mechanism in accordance with claim 1 wherein said lug is one of two pairs of identical lugs, one pair at each end of said base, said lugs of each pair being in alignment with one another and having a space therebetween, and both pairs carrying bolts in their respective bores slidable alternately between retracted and extended dispositions, said bolts having extended dispositions in opposed directions with each bolt overlying an opposite one of said flanges, respectively, to lock said engagement at diagonal corners of said base.

5. A quick releasable mechanism in accordance with claim 4 wherein said bolts extend between said lugs of each pair across said space therebetween, and including latch members affixed on said bolts in said space between the lugs of each of said pairs, said latch members abutting against said lugs at said retracted and extended positions of said bolts to provide limit stops thereat.

6. A quick, releasable mechanism in accordance with claim 5 wherein said base has slots, one at each end adjacent one of said lugs and contiguous with said space thereat, said latch members each being receivable within a respective one of said slots to hold said bolts in their extended positions.

7. A quick, releasable mechanism in accordance with claim 6 wherein each of said slots is directly beneath a portion of said space, respectively, and said latch members swing downwardly relative to the axes of said bolts into said slots for retention thereat by gravity.

8. A quick, releasable mechanism in accordance with claim 5 wherein said latch members swing downwardly on said bolts to rest on ledge portions of said base in said retracted dispositions of said bolts, said latch members having a sufficient length projecting outwardly beyond said ends of said base to provide a convenient handle for moving said bolts between said dispositions, as desired.

9. A lading tie-down anchor device for securement within spaced and opposed retaining flanges of an open mooring channel at desired positions therealong corresponding to notches in said flanges, said device comprising: a base movable longitudinally within said channel, said base being wider than the space between said opposed flanges; teeth projecting from said margins of said base for an engagement in said notches upon a closing together of said base and flanges, said engagement securing said base at a fixed position in said channel; a winch; means supporting said winch on said base for rotational movement relative thereto, said winch being narrower and longer than said space between said flanges and retractable within said channel upon longitudinal alignment of said winch and base and a separation of said base and flanges, said winch having surface portions at opposite ends thereof adapted to rest on said flanges and support said device thereon when said winch is turned laterally of the base and channel and said teeth and notches are disengaged; a lug affixed on said base at a position between said flanges, said lug projecting from said base with a portion thereof extending outward, during said engagement, beyond said flanges, said portion having therethrough a bore at an axis transverse to said flanges; and a bolt within said bore slidable alternately between a retracted disposition intermediate said flanges and an extended disposition overlying one of said flanges, said retracted disposition allowing separation of said base and flanges for disengagement of said teeth and notches allowing movement of said device along said channel, and said extended disposition preventing separation thereof to lock said engagement and secure said device at said fixed position.

10. A lading tie-down anchor device in accordance with claim 9 wherein said lug is one of two pairs of identical lugs, one pair at each end of said base, said lugs of each pair in register with one another and having a space therebetween, and both pairs carrying bolts in their respective bores slidable alternately between retracted and extended dispositions, said bolts having extended dispositions of opposed directions with each bolt overlying an opposite one of said flanges, respectively, to lock said engagement at diagonal corners of said base.

11. A lading tie-down anchor device in accordance with claim 10 wherein said bolts extend between said lugs of each pair across said space therebetween, and said base having slots, one at each end adjacent one of said lugs and contiguous with said space thereat, said device also including latch members affixed on said bolts in said space of each of said pairs, said latch members abutting against said lugs at said retracted and extended dispositions of said bolts to provide limit stops thereat, and said latch members each being receivable within a respective of said slots to secure said bolts at said extended positions.

12. A lading tie-down anchor device in accordance with claim 11 wherein each of said slots is directly beneath said space, respectively, and said latch members swing downwardly on said bolts into said slots for retention thereat by gravity, and said latch members also swinging downwardly to rest on said base at said retracted dispositions of said bolts, said latch members having a sufficient length projecting outwardly beyond said ends of said base to provide a convenient handle for moving said bolts between said dispositions, as desired.

References Cited by the Examiner

UNITED STATES PATENTS

| | | | |
|---|---|---|---|
| 1,934,697 | 11/1933 | Butterworth | 105—368 |
| 2,024,444 | 12/1935 | Friedlaender | 105—368 |
| 3,038,740 | 6/1962 | Blunden | 280—179 |
| 3,092,368 | 6/1963 | McDowell et al. | 105—368 |
| 3,120,375 | 2/1964 | Haynes | 254—150 |
| 3,140,850 | 7/1964 | Packard | 248—361 |

ARTHUR L. LA POINT, *Primary Examiner.*

D. E. HOFFMAN, *Assistant Examiner.*